(12) United States Patent
Chen et al.

(10) Patent No.: US 6,220,527 B1
(45) Date of Patent: Apr. 24, 2001

(54) CLEANING DEVICE HAVING CLEANING AGENT PROVIDED THEREIN

(76) Inventors: He-Jin Chen, No. 17, Alley 33, Lane 24, Sec 3, Chung Yang Road, Lung-Ching Hsiang, Taichung Hsien; Chia-Yi Hsieh, No. 37-2, Chung Hua Road, Wu-Chi Town, Taichung Hsien, both of (TW)

( * ) Notice: Subject to any disclaimer, the term of this patent is extended or adjusted under 35 U.S.C. 154(b) by 0 days.

(21) Appl. No.: 09/533,598

(22) Filed: Mar. 23, 2000

(51) Int. Cl.$^7$ ................................ B05B 1/30; B05B 15/06
(52) U.S. Cl. ................................................ 239/532; 239/586
(58) Field of Search .................................. 239/289, 532, 239/530, 525, 586; 401/24, 25, 27, 139, 195, 196, 289, 136, 137, 270; D32/40; 15/118

(56) References Cited

U.S. PATENT DOCUMENTS

| | | | |
|---|---|---|---|
| 358,875 | * | 3/1887 | Nichols . |
| 371,515 | * | 10/1887 | Nowotny . |
| 467,778 | * | 1/1892 | Clair . |
| 556,722 | * | 3/1896 | Ford . |
| 832,475 | * | 10/1906 | George . |
| 843,585 | * | 2/1907 | Cole . |
| 1,093,114 | * | 4/1914 | Corbett . |
| 1,132,449 | * | 3/1915 | Cox . |
| 2,262,334 | * | 11/1941 | Rugaard . |
| 2,343,604 | * | 3/1944 | Wilson . |
| 2,501,426 | * | 3/1950 | Voorhees . |
| 2,609,557 | * | 9/1952 | Reed . |
| 2,801,431 | * | 8/1957 | Eastis . |
| 3,377,123 | * | 4/1968 | Leeson . |

* cited by examiner

Primary Examiner—Lesley D. Morris
(74) Attorney, Agent, or Firm—Bacon & Thomas, PLLC (57) ABSTRACT

A cleaning device includes a handle with a longitudinal passage defined therethrough and a hollow shaft is connected to an end of the handle whose the other end is connected to a hose. A valve assembly is connected to the handle and a lower end of the valve assembly removably seals the passage in the handle. A nozzle device is pivotally connected to the hollow shaft so that cleaning agent from the hose is injected from the nozzle device. A connection tube is connected to the hollow shaft and a sponge assembly is connected to the connection tube.

9 Claims, 10 Drawing Sheets

CLEANING DEVICE HAVING CLEANING AGENT PROVIDED THEREIN

FIELD OF THE INVENTION

The present invention relates to a cleaning device, and more particularly, to a sponge mop that has a hollow shaft on which a valve is connected. Cleaning agent is provided in the shaft and is controlled by the valve.

BACKGROUND OF THE INVENTION

A conventional cleaning device such as a sponge mop generally includes a shaft with a grip on one end thereof and a sponge assembly is connected to the other end of the shaft. The shaft is made of hollow tubes which can be retractably engaged with each other so as to reach a far distance. A squeezing mechanism is connected to the sponge assembly so that when the user pulls a handle of the squeeze mechanism, a sponge member in the sponge assembly is squeezed by two rods and water absorbed in the sponge member is removed. In order to obtain a better cleaning feature, the user has to use a hose to provide water to the object so that the sponge member can be used normally. Nevertheless, it is inconvenient for the user to operate both the hose and the sponge mop.

The present invention intends to provide a sponge mop whose shaft is connected to a hose and a valve is connected to the shaft so as to control the flow of the cleaning agent from the hose.

SUMMARY OF THE INVENTION

In accordance with one aspect of the present invention, there is provided a cleaning device comprising a handle having a longitudinal passage defined therethrough. A hollow shaft and a hose are respectively connected to two ends of the handle. A valve assembly is connected to the handle and a lower end of the valve assembly removably seals the passage in the handle. The hollow shaft is connected to a nozzle device which has a nozzle pivotally extending outward from the nozzle device. A connection tube is connected to the hollow shaft so as to be connected to a sponge assembly.

The object of the present invention is to provide a cleaning device that is connected with a hose and a nozzle device so that cleaning agent from the hose is injected from the nozzle to increase cleaning feature of the cleaning device.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
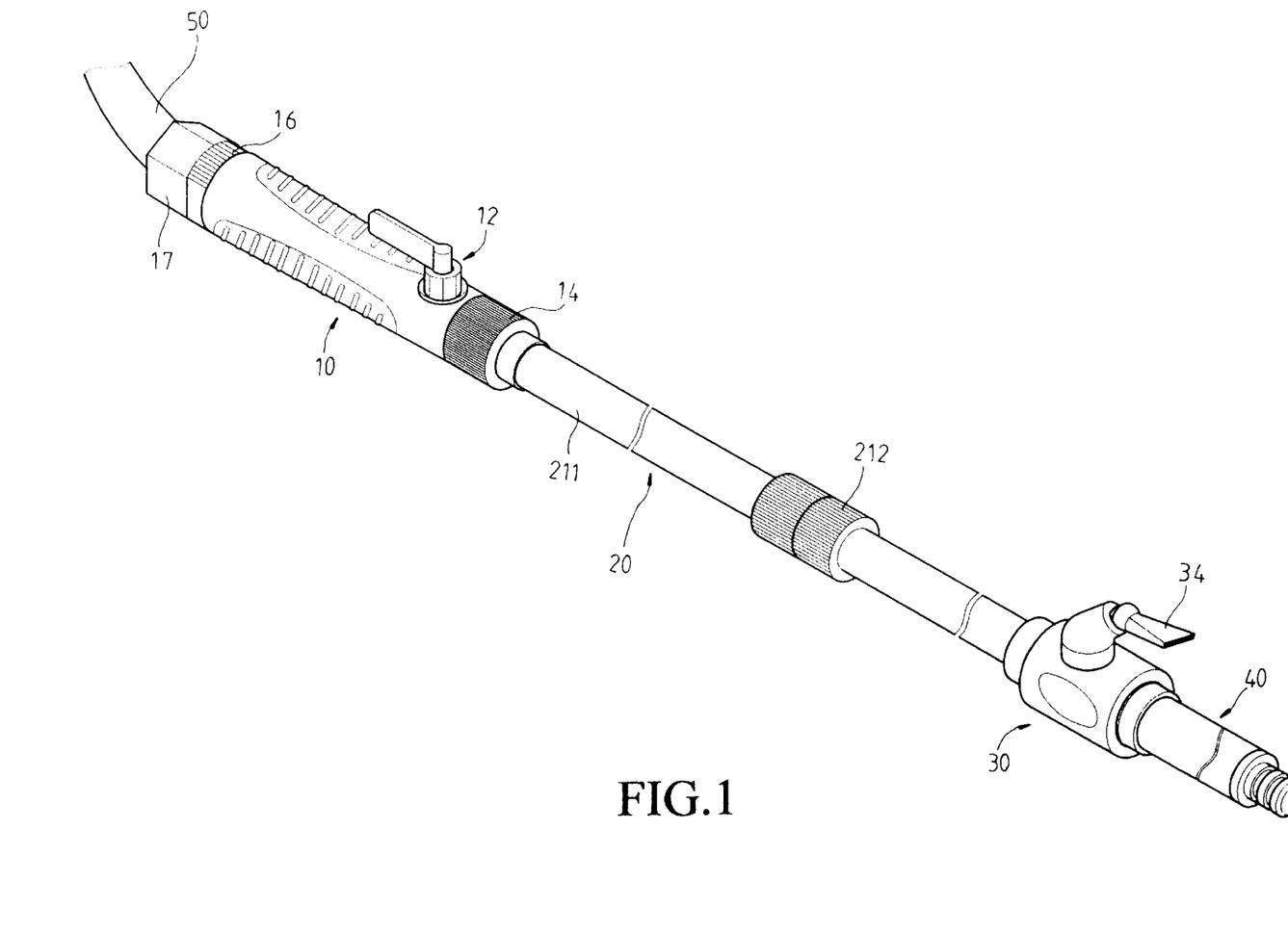
FIG. 1 is a perspective view to show a cleaning device in accordance with the present invention.
Figure 2:
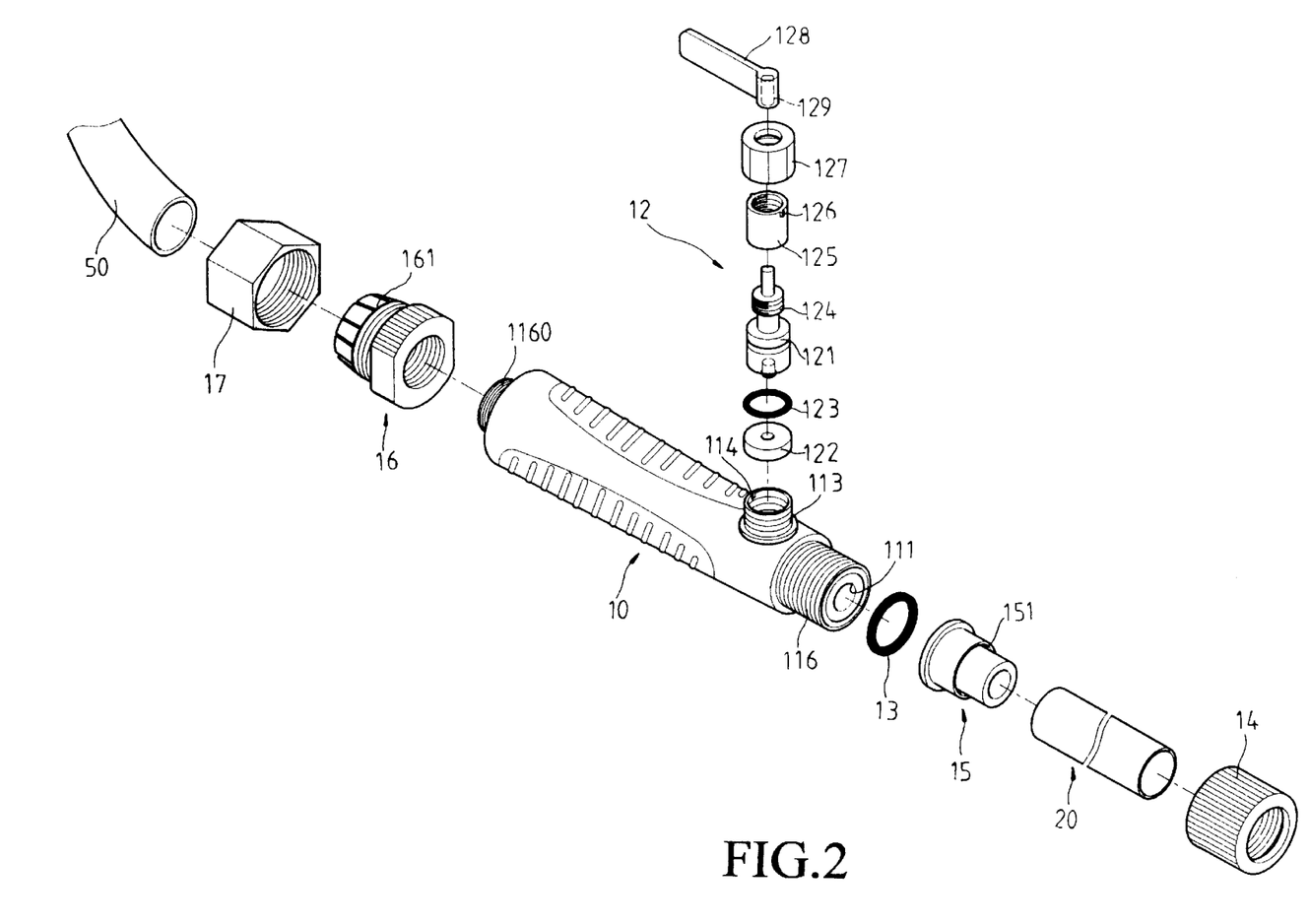
FIG. 2 is an exploded view to show a combination of a handle, a valve assembly, a hose and a shaft of the cleaning device of the present invention.
Figure 3:
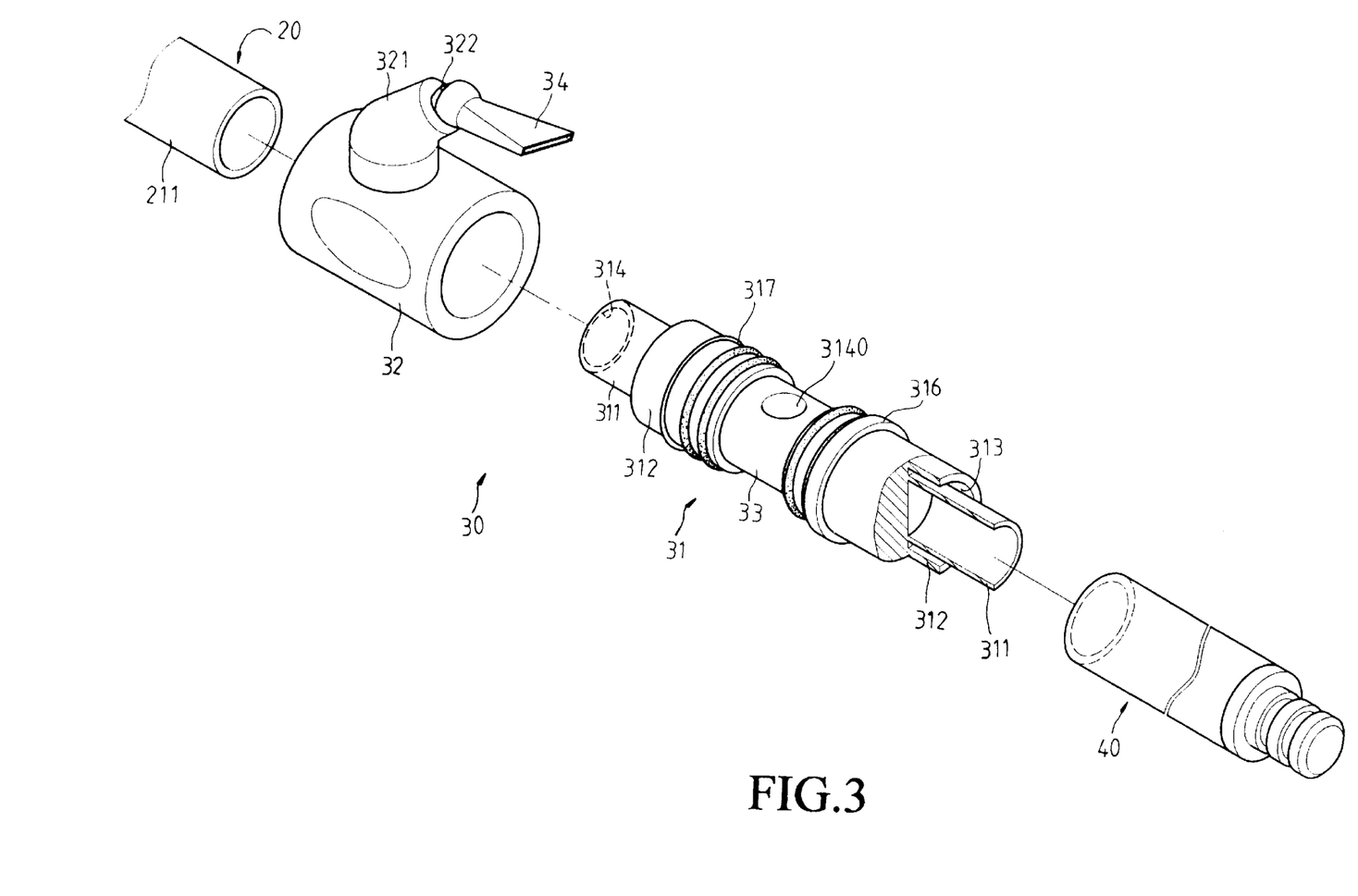
FIG. 3 is an exploded view to show a combination of a nozzle device, a shaft and a connection tube of the cleaning device of the present invention.
Figure 4:
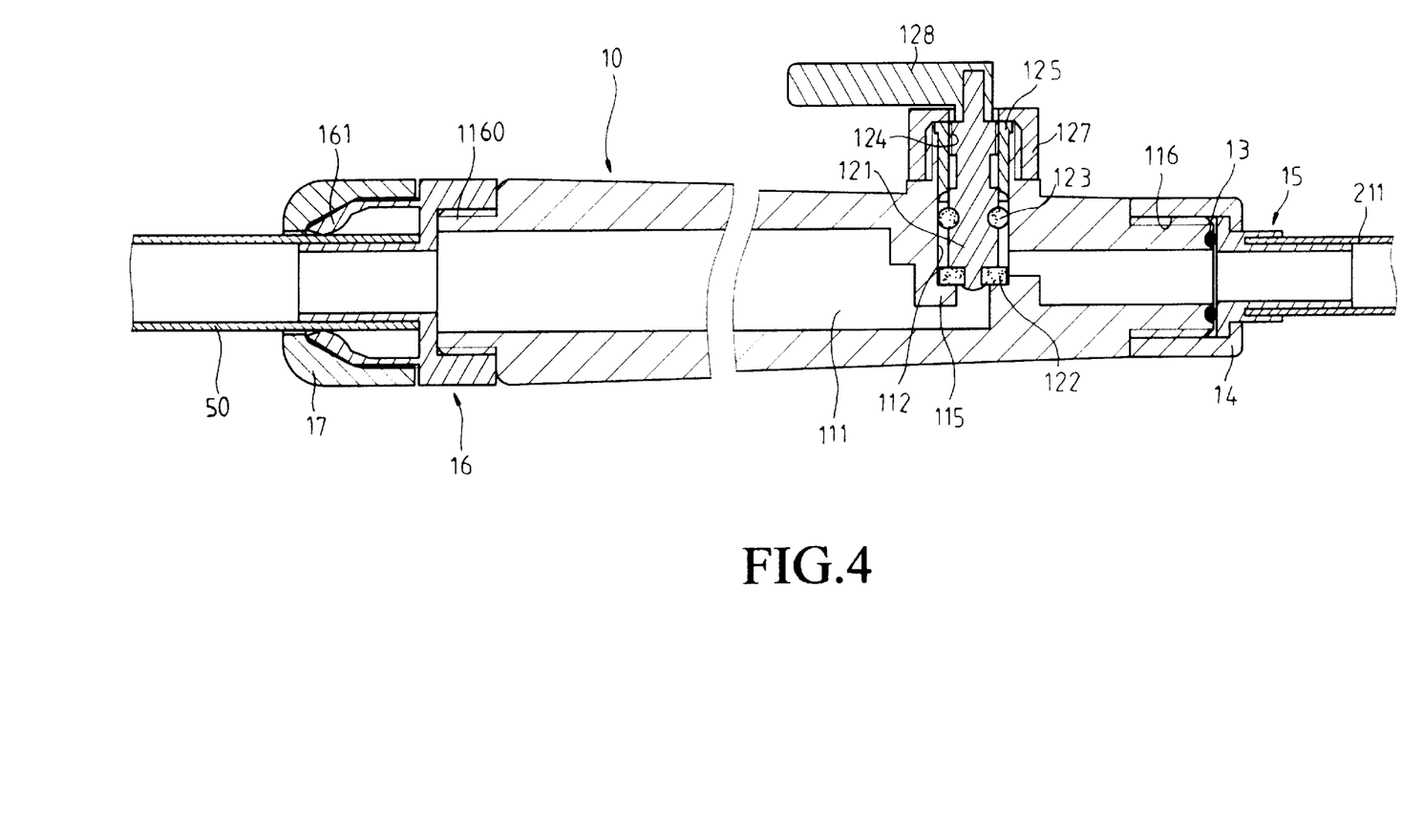
FIG. 4 is a side elevational view, partly in section, of the valve assembly connected to the handle wherein the valve assembly is in shut-off position.
Figure 5:
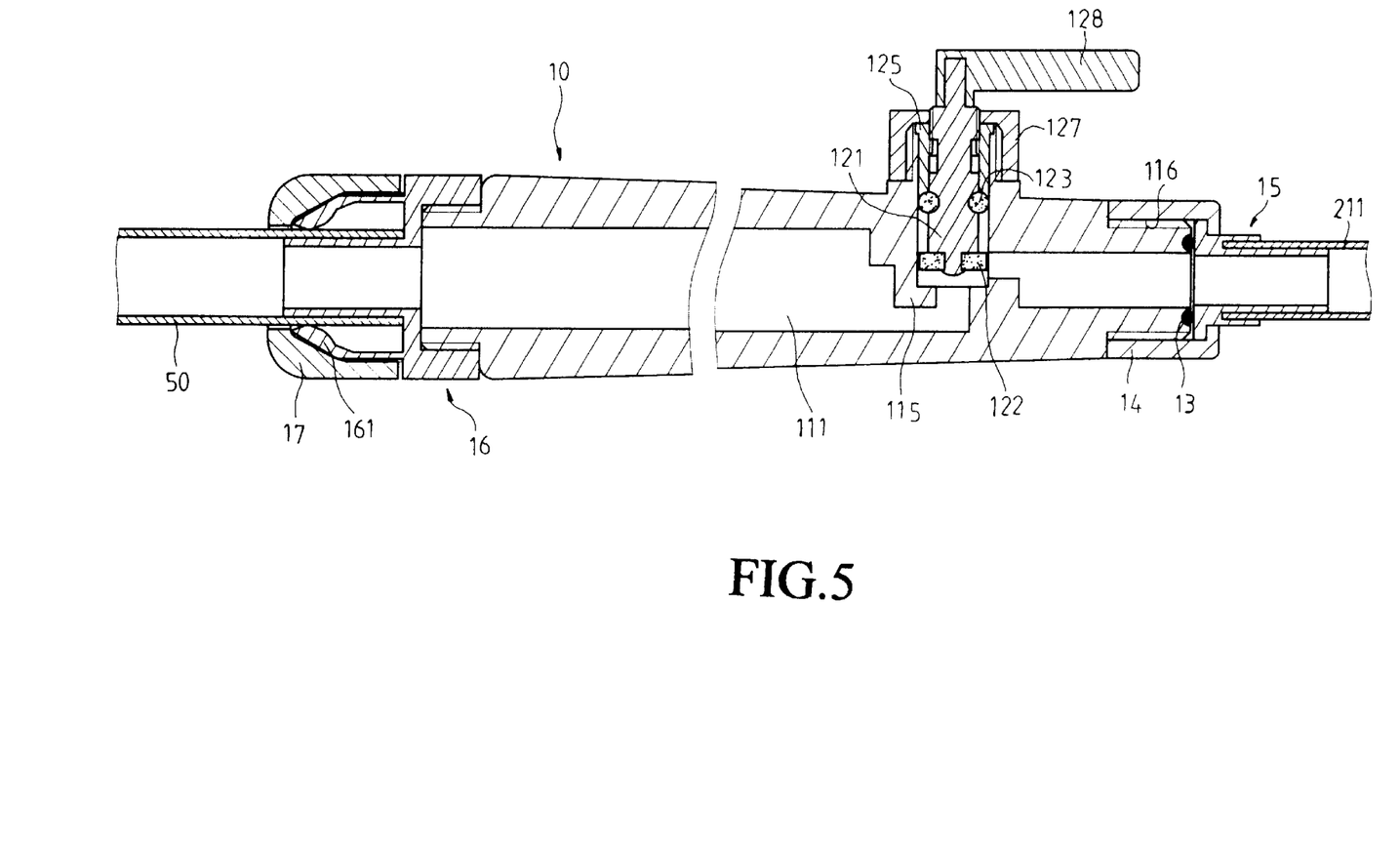
FIG. 5 is a side elevational view, partly in section, of the valve assembly connected to the handle wherein the valve assembly is in open position.

Referring to FIGS. 1 to 4, the cleaning device in accordance with the present invention comprises a handle 10 having a longitudinal passage 111 defined therethrough. A first end of the handle 10 has a connection section 116 so as to be connected to a seal ring 13, an adapter 15, a hollow shaft 20 engaged with an end groove 151 of the adapter 15 and a locking member 14 is threadedly connected to the connection section 116 so as to retain the adapter 15 and the hollow shaft 20 therein. The hollow shaft 20 can be composed of two sections 211 which are connected by a connection sleeve 212. A second end of the handle 10 has the other connection section 1160 so as to be connected to a nut member 16, a retaining collar 17 and a hose 50 which is clamped between a tapered end 161 on the nut member 16 and the retaining collar 17. Therefore, cleaning agent in the hose 50 can flow into the passage 111 in the handle 10 and the hollow shaft 20. The handle 10 has a radial hole 112 defined therethrough and the radial hole 112 communicates with the passage 111. A threaded tube 113 extends radially outward from the handle 10 and communicates with the radial hole 112. A valve assembly 12 is received in the threaded tube 113 and includes a piston 121 movably received in the threaded tube 113. A seal ring 123 and a pad 122 are connected to a lower end of the piston 121. A sleeve 125 is received in the threaded tube 113 and the piston 121 has a threaded section 124 which is movably and threadedly engaged with the sleeve 125. A cap 127 is threadedly connected to the threaded tube 113 to retain the piston 121 from being drop out from the threaded tube 113. A lever 128 is connected to a top of the piston 121 so that when rotating the lever 128, the piston 121 moves relative to the sleeve 125. The sleeve 125 has two bosses 126 extending from an outside thereof and tow notches 114 are defined in an inside of the threaded tube 113, the two bosses 126 being received in the notches 114 and the sleeve 125 will not rotate in the threaded tube 113. As shown in FIG. 4, two protrusions 115 respectively extend radially inward from an inside of the passage 11 in opposite directions. A gap is defined between the two protrusions 115 and the pad 122 on the lower end of the valve assembly 12 is removably engaged with the two protrusions 115 and seals the gap when the valve assembly 12 is in a shut-off position. As shown in FIG. 5, when rotating the lever 128, the piston 121 is moved upward and the pad 122 is moved to open the gap and cleaning agent from the hose 50 can flow through the gap and enter in the shaft 20.

Figure 6:
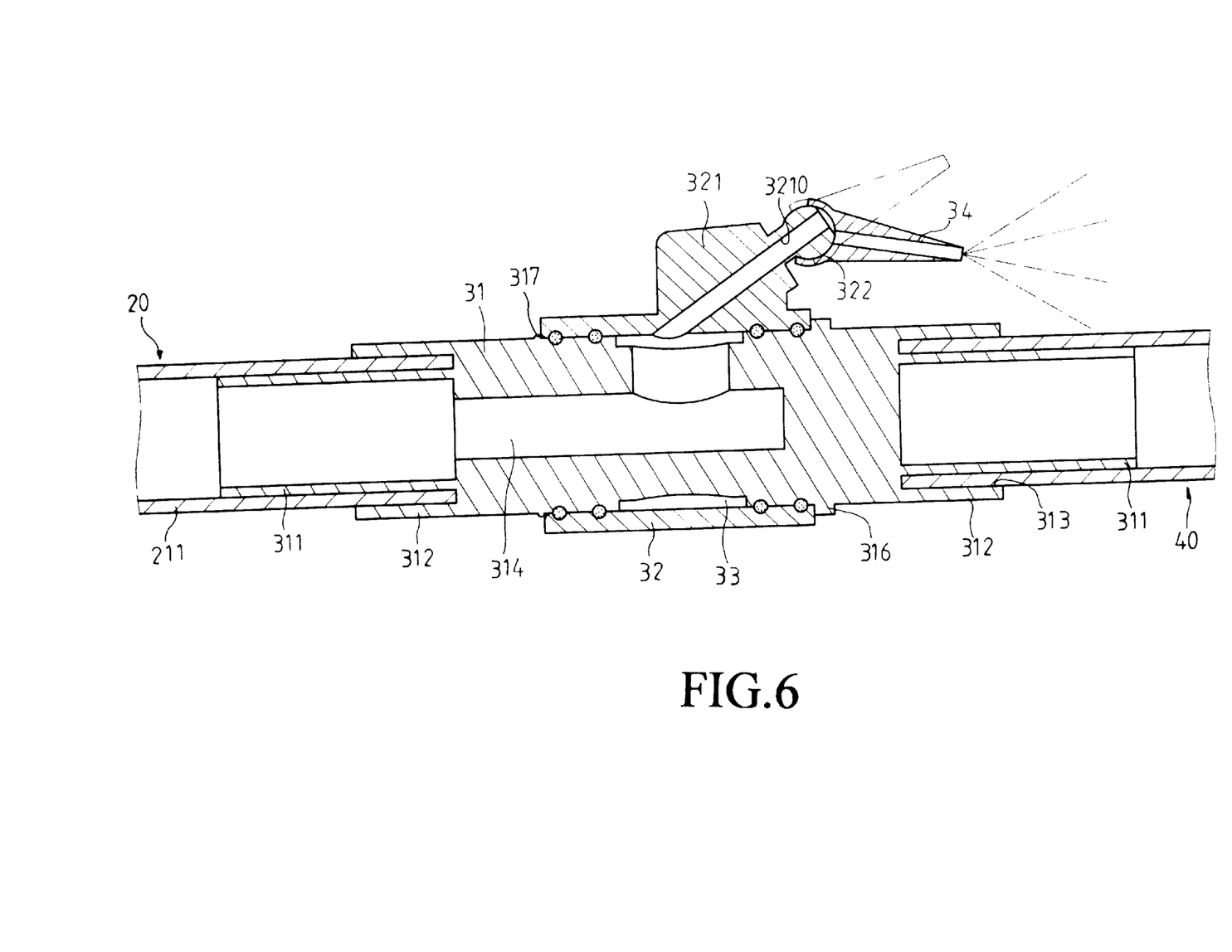
FIG. 6 is a side elevational view, partly in section, of the nozzle device of the present invention.

Further referring to FIG. 6, the nozzle device 30 includes a tubular portion 31 and a sleeve portion 32 which is mounted to the tubular portion 31. A central passage 314 is longitudinally defined in the tubular portion 31 and an aperture 3140 is defined radially through the tubular portion 31 and communicates with the central passage 314. An annular groove 33 is defined in an outside of the tubular portion 31 and communicates with the aperture 3140. Two flanges 316, 317 extend radially outward from the tubular portion 31 and the sleeve portion 32 is retained between the two flanges 316, 317. A tubular member 321 extends radially from an outside of the sleeve portion 32, a radial passage 3210 defined through the tubular member 321 and communicating with the annular groove 33. A sphere 322 is located on a distal end of the tubular member 321 and the nozzle 34 is rotatably mounted to the sphere 322.

Figure 9:
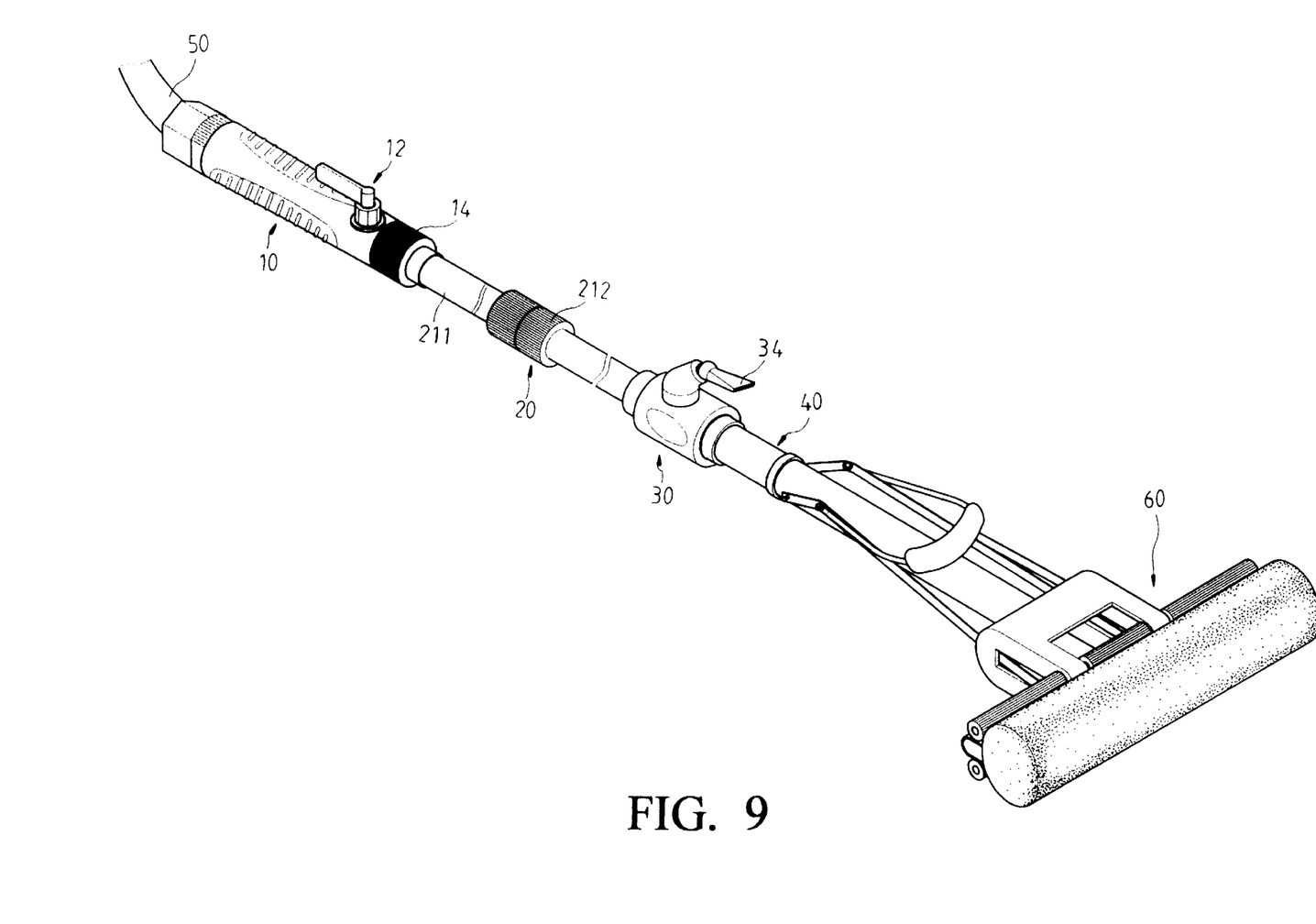
FIG. 9 is a perspective view to show the cleaning device of present invention which is connected to a sponge assembly.
Figure 10:
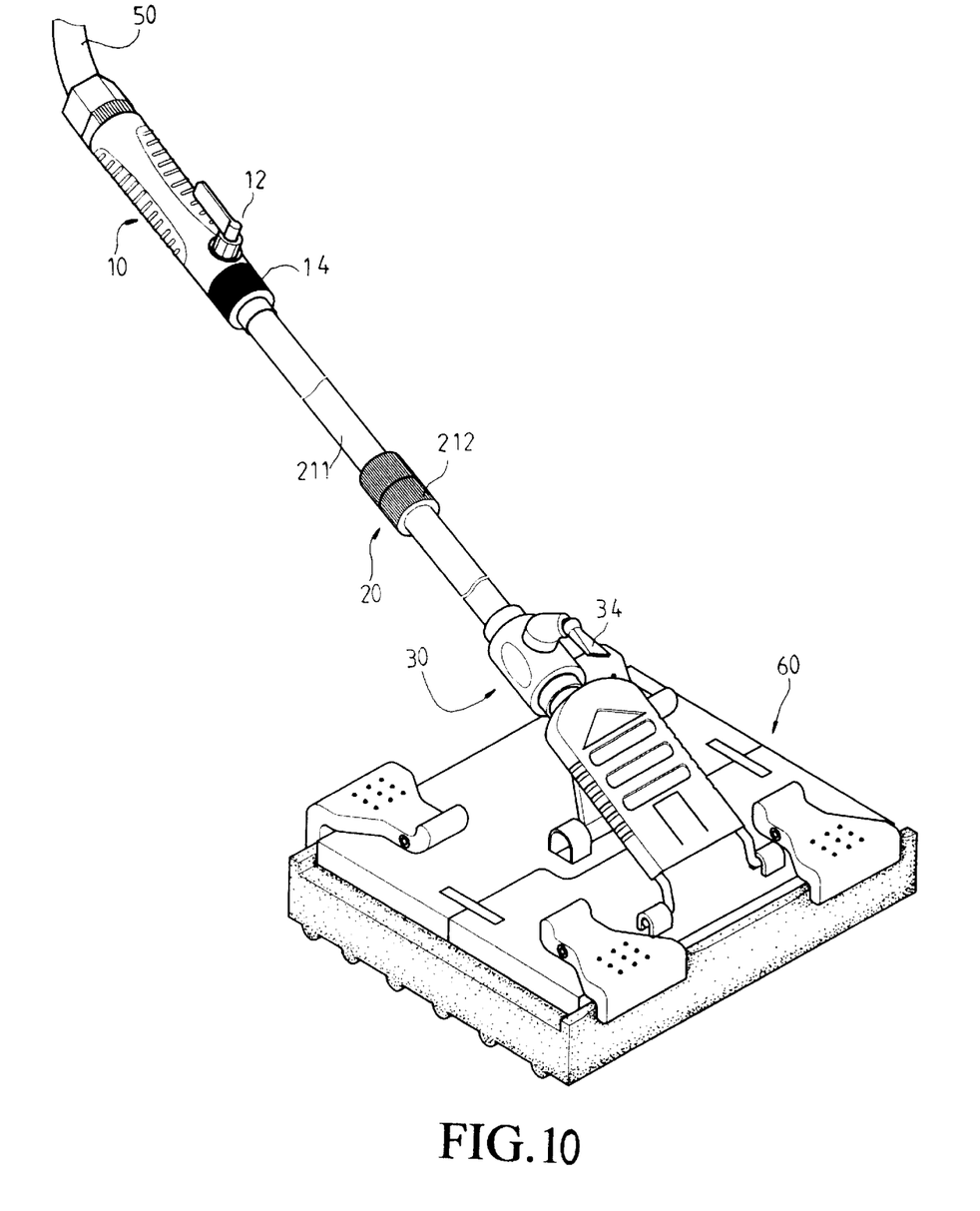
FIG. 10 is a perspective view to show the cleaning device of present invention which is connected to another type of sponge assembly.

An outer tube 312 extends from a first end of the tubular portion 31 and a receiving groove 313 is defined between the first end of the tubular portion 31 and the outer tube 312. An end of the connection tube 40 is engaged with the receiving groove 313 and the other end of the connection tube 40 is connected to a sponge assembly 60 as shown in FIGS. 9 and 10. An outer tube 312 extends from a second end of the tubular portion 31 and a receiving groove 313 is defined between the second end of the tubular portion 31 and the outer tube 312, an end of the hollow shaft 20 engaged with the receiving groove 313.

The cleaning agent flows into the central passage 314 and is filled in the annular groove 33, so that the sleeve portion 32 is allowed to be rotated to a desired position and the cleaning agent injects from the nozzle 34 via the radial passage 3210.

Figure 7:
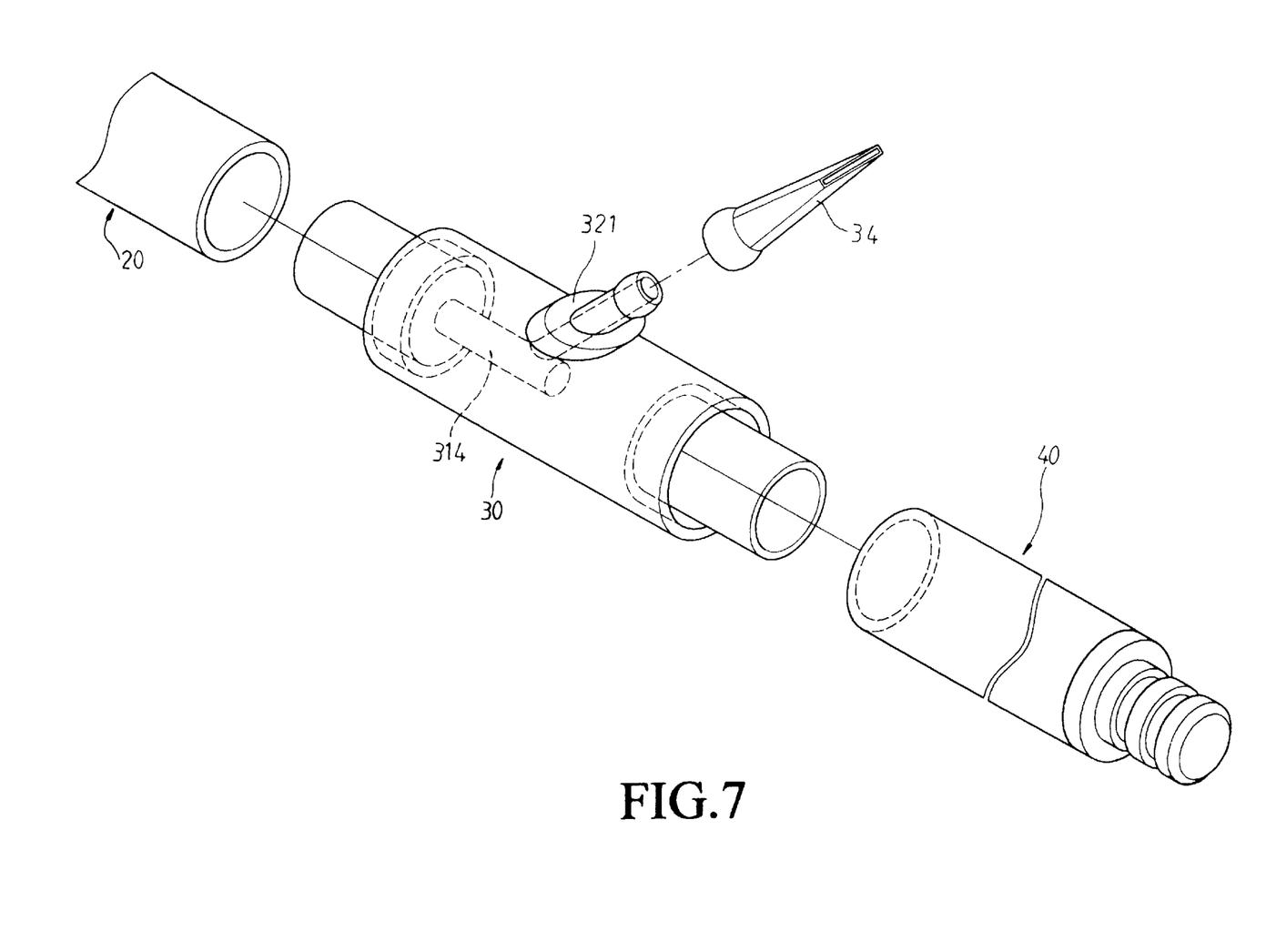
FIG. 7 is an exploded view to show another embodiment of the nozzle device, the shaft and the connection tube of the cleaning device of the present invention.
Figure 8:
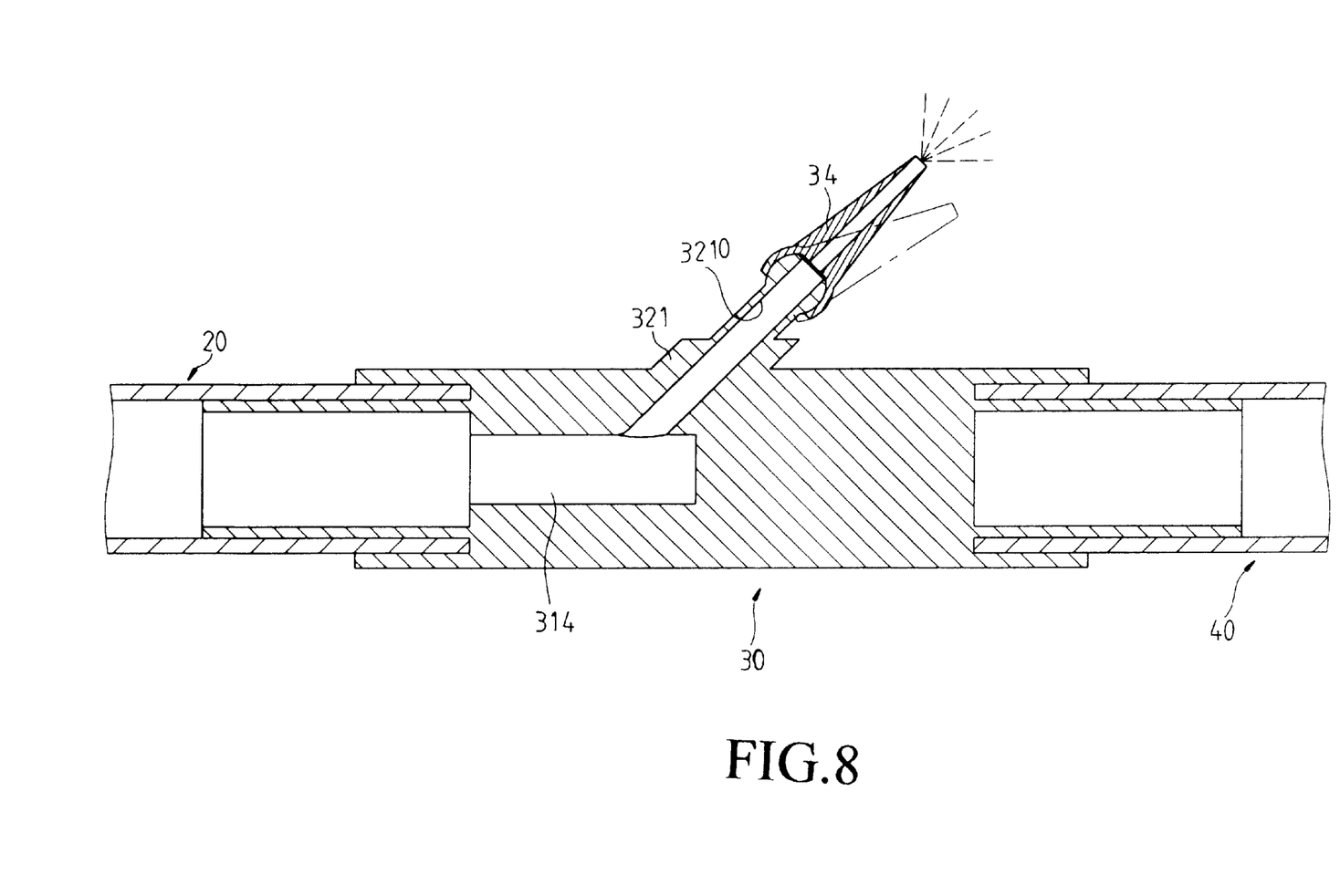
FIG. 8 is a side elevational view, partly in section, of the nozzle device as shown in FIG. 7 of the present invention.

FIGS. 7 and 8 show another embodiment of the nozzle device 30 which is securely connected between the connection tube 40 and the hollow shaft 20. A tubular member 321 extends radially outward from the nozzle device 30 and a nozzle 34 is pivotally connected to the tubular member 321. A central passage 314 is defined in the nozzle device 30 and the cleaning agent injects from the nozzle 34 via a radial passage 3210 in the tubular member 321.

The direction of the nozzle 34 can be oriented according to the user's need and the user simply operates the lever 128 of the valve assembly 12 to let the cleaning agent be spread on the desired object.

While we have shown and described various embodiments in accordance with the present invention, it should be clear to those skilled in the art that further embodiments may be made without departing from the scope and spirit of the present invention.

What is claimed is:

1. A cleaning device comprising:
    a handle having a longitudinal passage defined therethrough, a first end of said handle connected to a hollow shaft and a second end of said handle connected to a hose, a valve assembly connected to said handle and a lower end of said valve assembly removably sealing said passage in said handle;
    said hollow shaft connected to a nozzle device and said nozzle device having a central passage longitudinally defined therein and a tubular member extending radially from said nozzle device, a radial passage defined through said tubular member and communicating with said central passage, and a nozzle pivotally connected to said tubular member.

2. The cleaning device as claimed in claim 1 further comprising two protrusions respectively extending radially inward from an inside of said passage in opposite directions, a gap defined between said two protrusions and said lower end of said valve assembly removably engaged with said two protrusions and sealing said gap when said valve assembly is in a shut-off position.

3. The cleaning device as claimed in claim 1 further comprising a threaded tube extending outward from said handle and said threaded tube communicating with said passage, a piston movably received in said threaded tube and a cap engaged with said threaded tube, said piston threadedly engaged with an inside of said cap, a lever connected to a top of said piston so that when rotating said lever, said piston moves relative to said cap.

4. The cleaning device as claimed in claim 1 further comprising a sphere on a distal end of said tubular member and said nozzle rotatably mounted to said sphere.

5. The cleaning device as claimed in claim 1, wherein said nozzle device comprises a tubular portion and a sleeve portion which is mounted to said tubular portion, a central passage longitudinally defined in said tubular portion and an aperture defined radially through said tubular portion and communicating with said central passage, an annular groove defined in an outside of said tubular portion and communicating with said aperture, a tubular member extending radially from an outside of said sleeve portion, a radial passage defined through said tubular member and communicating with said annular groove, said nozzle pivotally connected to said tubular member.

6. The cleaning device as claimed in claim 5 further comprising a sphere on a distal end of said tubular member and said nozzle rotatably mounted to said sphere.

7. The cleaning device as claimed in claim 5 further comprising an outer tube extending from a first end of said tubular portion and a receiving groove defined between said first end of said tubular portion and said outer tube, an end of said connection tube engaged with said receiving groove.

8. The cleaning device as claimed in claim 5 further comprising two flanges extending radially outward from said tubular portion and said sleeve portion retained bewteen said two flanges.

9. The cleaning device as claimed in claim 5 further comprising an outer tube extending from a second end of said tubular portion and a receiving groove defined between said second end of said tubular portion and said outer tube, an end of said hollow shaft engaged with said receiving groove.

* * * * *